(12) United States Patent
Lee et al.

(10) Patent No.: US 8,301,200 B1
(45) Date of Patent: Oct. 30, 2012

(54) INPUTTING DATA INTO A MOBILE DEVICE USING A DYNAMICALLY CONFIGURED NUMBER PAD

(75) Inventors: Woojae Lee, Manhattan, KS (US); Trevor Daniel Shipley, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 384 days.

(21) Appl. No.: 12/617,218

(22) Filed: Nov. 12, 2009

(51) Int. Cl.
*H04Q 7/32* (2006.01)
(52) U.S. Cl. ............... 455/566; 455/564; 455/550.1; 455/565; 455/575.1; 455/90.3; 379/433.01; 379/355.01; 379/355.02; 379/355.05; 379/355.06
(58) Field of Classification Search .............. 455/566, 455/564, 550.1, 575.1, 412.1, 412.2, 565, 455/90.3, 422.1, 403; 379/433.01, 433.06, 379/355.01, 355.02, 355.05, 355.06
See application file for complete search history.

(56) References Cited

U.S. PATENT DOCUMENTS
2007/0057822 A1* 3/2007 Davies ............................ 341/22

OTHER PUBLICATIONS

Donald Melanson; Engadget; Eyes-Free Shell for Android Actually Delivers on its Name; Apr. 2, 2009; 5 pages; http://www.engadget.com/2009/04/03/eyes-free-shell-for-android-actually-delivers-on-its-name.

* cited by examiner

*Primary Examiner* — Keith Ferguson (57) ABSTRACT

Systems, products, and methods are disclosed for facilitating a method of receiving data from a keypad of the mobile communications device. One embodiment of the method includes receiving input by way of a given key of the keypad and then dynamically configuring that given key to be a "5" key. In this way, input received by way of this given key will be received as the Arabic numeral "5" regardless of a prior configuration associated with that key. A final illustrative step includes dynamically mapping numerical values to the eight surrounding keys that surround the newly configured "5" key.

14 Claims, 14 Drawing Sheets

INPUTTING DATA INTO A MOBILE DEVICE USING A DYNAMICALLY CONFIGURED NUMBER PAD

SUMMARY

Embodiments of the invention are defined by the claims below, not this summary. A high-level overview of various aspects of the invention are provided here for that reason, to provide an overview of the disclosure, and to introduce a selection of concepts that are further described below in the detailed-description section. This summary is not intended to identify key features or essential features of the claimed subject matter, nor is it intended to be used as an aid in isolation to determine the scope of the claimed subject matter. In brief and at a high level, this disclosure describes, among other things, ways to make inputting data into a mobile communications device easier, especially regarding numerical data. Instead of key values being fixed, a first-pressed key becomes the "5" key, and then the keys surrounding it become mapped to the remaining "1"-"9" digits.

BRIEF DESCRIPTION OF THE SEVERAL VIEWS OF THE DRAWINGS

Illustrative embodiments of the present invention are described in detail below with reference to the attached drawing figures, wherein.

DETAILED DESCRIPTION

The subject matter of the present invention is described with specificity herein to meet statutory requirements. However, the description itself is not intended to define the invention, which is what the claims do. Rather, the claimed subject matter might be embodied in other ways to include different steps or combinations of steps similar to the ones described in this document, in conjunction with other present or future technologies. Moreover, although the term "step" or other generic term might be used herein to connote different components or methods employed, the terms should not be interpreted as implying any particular order among or between various steps herein disclosed unless and except when the order of individual steps is explicitly described.

Throughout this disclosure, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present invention. The following is a list of these acronyms:

| | |
|---|---|
| ASCII | American Standard Code for Information Interchange |
| AFB | American Foundation for the Blind |
| CDMA | Code Division Multiple Access |
| GPRS | General Packet Radio Service |
| GSM | Global System for Mobile communications: originally from Groupe Spécial Mobile |
| IP | Internet Protocol |
| TDMA | Time Division Multiple Access |
| UMTS | Universal Mobile Telecommunications System |

Further, various technical terms are used throughout this description. An illustrative resource that fleshes out various aspects of these terms can be found in Newton's Telecom Dictionary by H. Newton, 24th Edition (2008).

Embodiments of the present invention may be embodied as, among other things: a method, system, or set of instructions embodied on one or more computer-readable media. Computer-readable media include both volatile and nonvolatile media, removable and nonremovable media, and contemplate media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Figure 1:
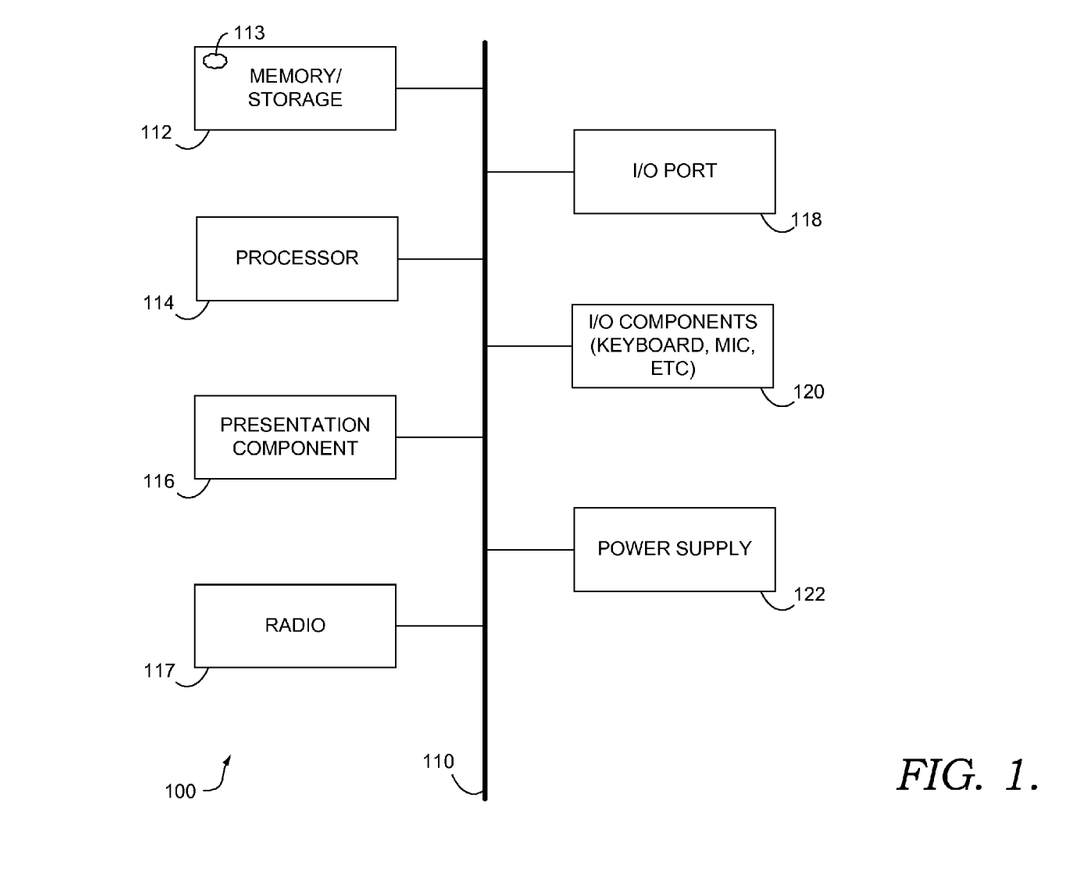
FIG. 1 depicts an illustrative device suitable for use in connection with an embodiment of the present invention.

Turning now to FIG. 1, a block diagram of an illustrative mobile computing device ("mobile device") is provided and referenced generally by the numeral 100. Although some components are shown in the singular, they may be plural. For example, mobile device 100 might include multiple processors or multiple radios, etc. As illustratively shown, mobile device 100 includes a bus 110 that directly or indirectly couples various components together including memory 112, a processor 114, a presentation component 116, a radio 117, input/output ports 118, input/output components 120, and a power supply 122.

We have previously described various memory components that memory 112 might take the form of. Thus, we will not elaborate more here, only to say that memory component 112 can include any type of medium that is capable of storing information (e.g., a database). A database can be any collection of records. In one embodiment, memory 112 includes a set of embodied computer-executable instructions 113 that, when executed, facilitate various aspects disclosed herein. These embodied instructions will variously be referred to as "instructions 113" or "application 113" for short.

Processor 114 might actually be multiple processors that receive instructions and process them accordingly. Presentation component 116 includes the likes of a display, a speaker, as well as other components that can present information (such as a lamp (LED), or even lighted keyboards).

Radio 117 represents a radio that facilitates communication with a wireless telecommunications network. Illustrative wireless telecommunications technologies include CDMA, GPRS, TDMA, GSM, and the like (including what is known in the art as WiMax technology and also Long Term Evolution (LTE). In some embodiments, radio 117 might also facilitate other types of wireless communications including Wi-Fi communications and GIS communications.

Input/output port 118 might take on a variety of forms. Illustrative input/output ports include a USB jack, stereo jack, infrared port, proprietary communications ports, and the like. Input/output components 120 include items such as keyboards, microphones, touch screens, and any other item usable to directly or indirectly input data into mobile device 110. Power supply 122 includes items such as batteries, fuel cells, or any other component that can act as a power source to power mobile device 100.

Figure 2A:
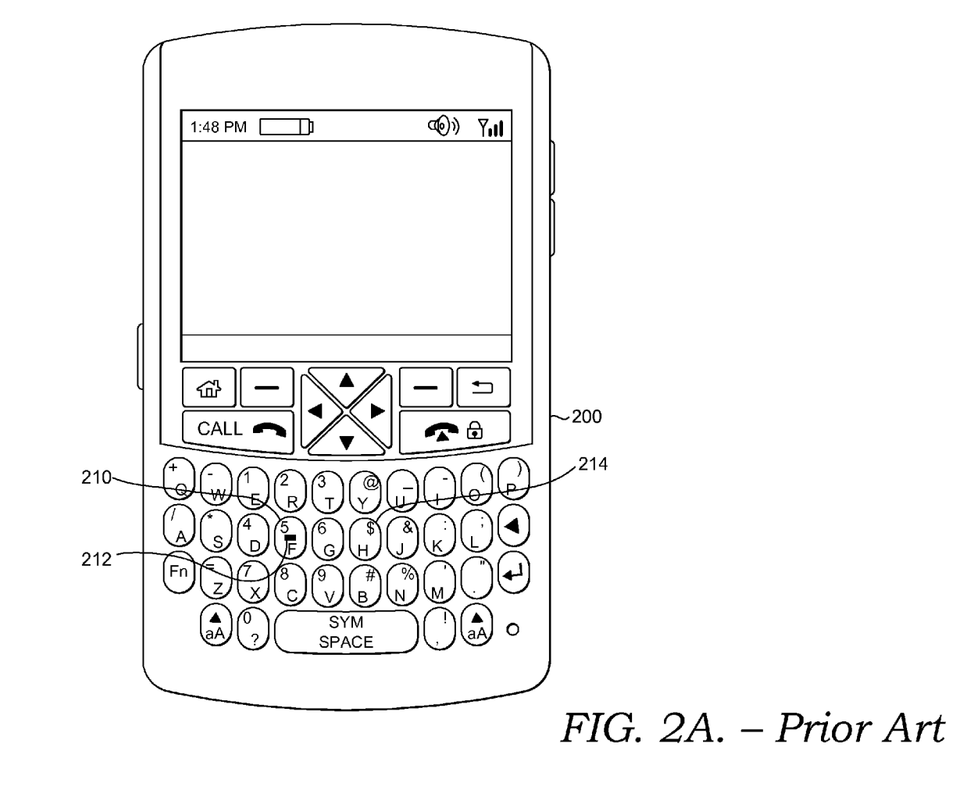
FIGS. 2A-2C depict prior-art embodiments of mobile devices that include protrusions on at least one key of a keypad.
Figure 2B:
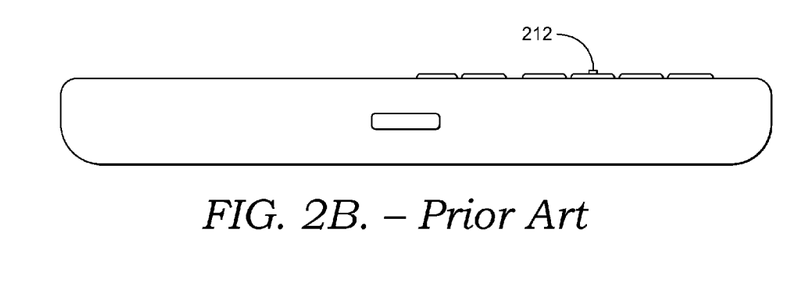
Figure 2C:
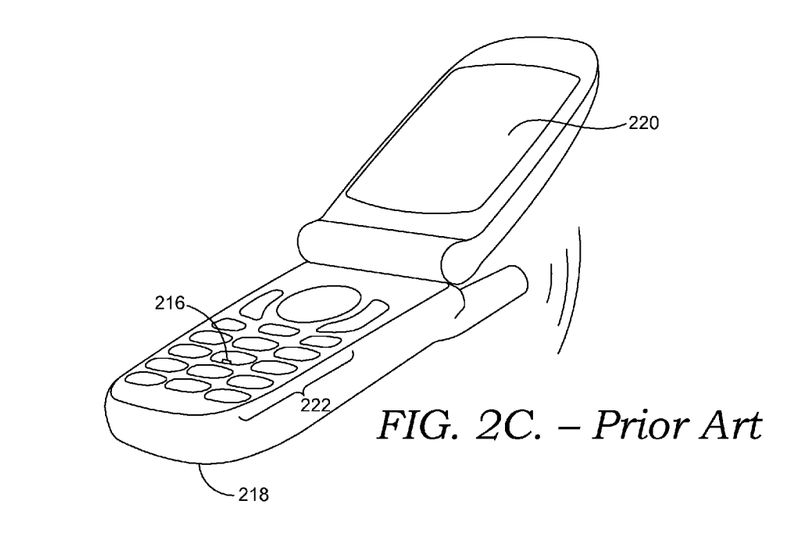

Turning now to FIG. 2A, an illustrative prior-art mobile device is provided and referenced generally by the numeral 200. In such a device, a "5" key 210 includes a nub 212 that makes finding the "5" key easier. In some cases, individuals with visual impairments are able to locate the "5" key 210 because of the presence of the nub 212, which protrudes upward and outward from the "5" key itself. Sometimes, other keys include such a nub. For example, the "H" key 214 might also include a nub (not shown). Nub 212 is also shown from a side perspective on FIG. 2B, which is also prior art. Similarly, a nub 216 (FIG. 2C) is common on clamshell-type phones, including phone 218.

Although there are advantages to including a nub on the "5" key to help locate it, there are also drawbacks. For example, some people have a hard time actually finding or feeling the nub. Sometimes the nub scratches a screen, such as screen 220 of FIG. 2C, when it is collapsed onto keyboard 222. Moreover, sometimes the protrusion can lead to the key being inadvertently pressed.

But, as mentioned, being able to locate the "5" key is desirable because once the "5" key is located people know how to locate the other keys. Digits "1" through "9" surround the "5" key and are generally contiguous to it; meaning that even if they do not necessarily touch the "5" key, there are no other keys in between the "5" key and each of the other eight keys, being associated with Arabic numerals "1" through "9."

Figure 3A:
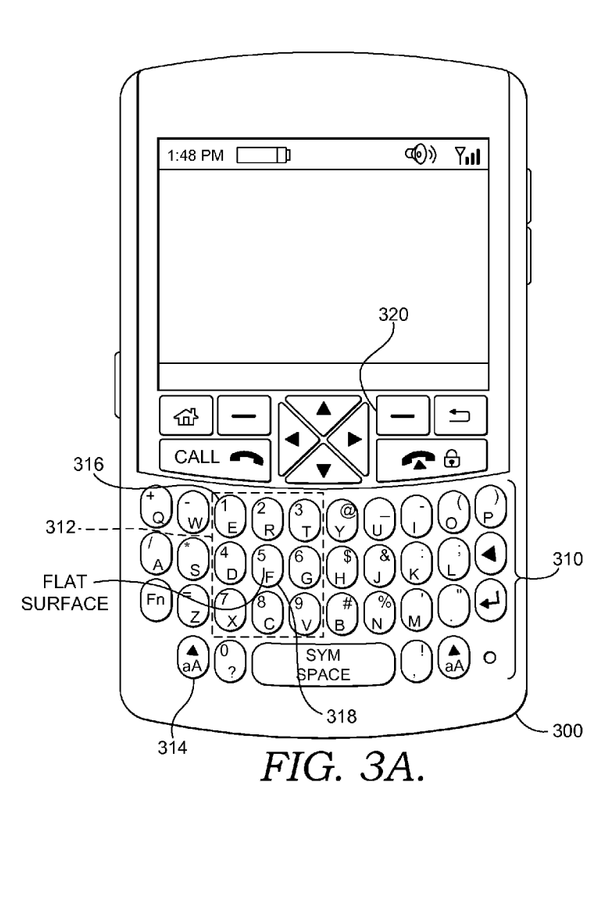
FIGS. 3A-3B depict mobile communications devices with no keys that include a protrusion in accordance with an embodiment of the present invention.
Figure 3B:
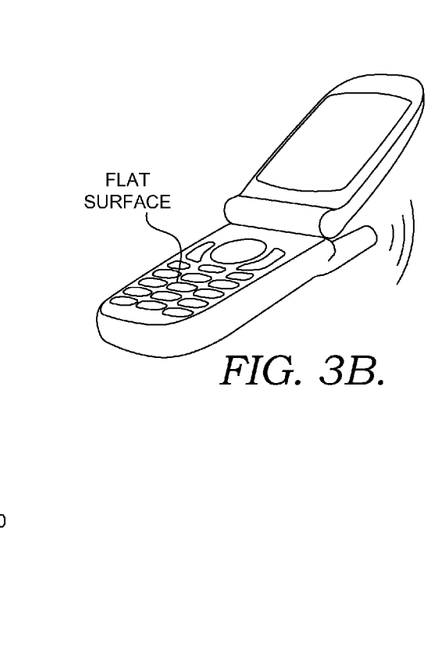

Turning now to FIG. 3A, a mobile device is depicted in accordance with an embodiment of the present invention and is generally referred to by the numeral 300. Mobile device 300 includes a set of physically-depressible keys 310, which in one embodiment includes all of the letters of the English alphabet. In other embodiments, letters of other alphabets are included. A subset of keys 312 is operable to convey numeric data to mobile device 300. As shown, the subset of keys 312 includes keys that have an ability to convey Arabic numerals "1"-"9" to mobile communications device 300. Sometimes this requires pressing a "shift" key 314 or some other key that when pressed triggers the input of numeric instead of alphabetic data. The "5" key of mobile device 300 has a flat surface with no protrusion that protrudes upward and outward from the surface. If device 300 were of the clamshell type; that is, hinged as shown in FIG. 3B, then it too would have a flat surface on the "5" as well as every other key.

Keyboard 310 includes multiple rows of keys. In the example shown, it includes four rows. Each key is often referred to by letter or number. For example, reference numeral 316 is directed to the "1" key. When we refer to the "1" key, we mean that when that key is pressed, mobile device 300 receives as input an Arabic numeral "1." Similarly, when the number "2" key is pressed, mobile device 300 receives as input the Arabic numeral "2." This would be the case even if the keys were not marked. Just because key 316 bears the marking of a "1" does not mean that it must always convey an Arabic numeral "1" according to our technology. Our technology contemplates that the same physical key is usable to convey different data. That is, computer-executable instructions 113 in combination with processor 114 and other elements work together to map certain keys to certain inputted data based on an initial selection of a "5" key. We will begin explaining this in greater detail with reference to FIG. 4.

Figure 4:
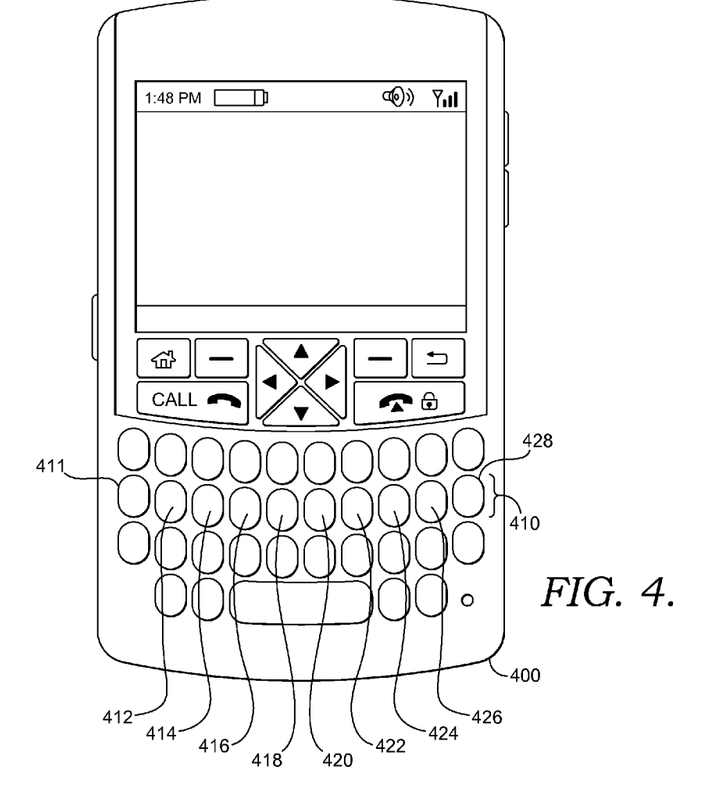
FIG. 4 depicts an illustrative row of keys that are available to the "5" keys in accordance with an embodiment of the present invention.

Turning now to FIG. 4, a device 400 includes a row 410 of keys. Device 400 is given a separate number so as to make referring to it easier, but it can be the same or identical device as that of FIG. 3A. Row 410 includes a left-most key 411 as well as other keys that are indicated by reference numerals 412, 414, 416, 418, 420, 422, 424, 426, and finally a right-most key 428. According to an embodiment of our technology, each of keys 412-426 can be a "5" key.

Figure 4A:
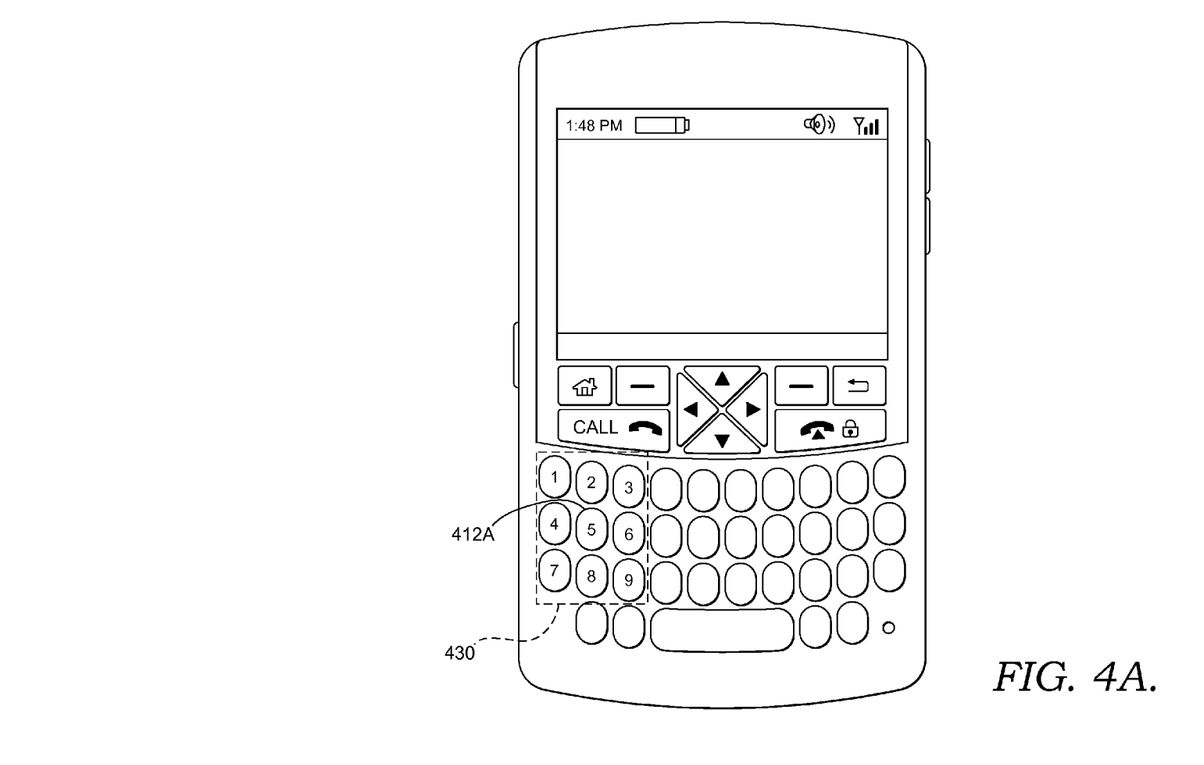
FIGS. 4A-4H depict various possible key remappings or configurations consistent with various embodiments of the present invention.

That is, any of the keys 412-426 can, when pressed, convey an Arabic numeral "5" to the mobile device. Whichever of keys 412-426 are pressed, that key becomes the "5" key. For example, if a person were to select key 412 first, then, according to our technology, it would become the "5" key and the other keys surrounding it would become mapped to Arabic numerals "1"-"9." This example is shown in FIG. 4A. FIG. 4A depicts a set of keys 430 in which the "5" key 412A is in the middle and the other keys "1"-"9" are arranged around and contiguous with the "5" key. To restate this, reconsider FIG. 2A, in which the "5" key 210 is fixed. In that case, whenever key 210 is pressed the numeral "5" will be conveyed to mobile device 200. But according to embodiments of our technology, the mobile device can be placed into a mode such that whenever a key of row 410 is pressed, the pressing of that key indicates that that key is to be the "5" key. The other numerals are then mapped according to the pressing of the first key. We have already illustrated one example in connection with the pressing of key 412 (FIG. 4A).

Figure 4B:
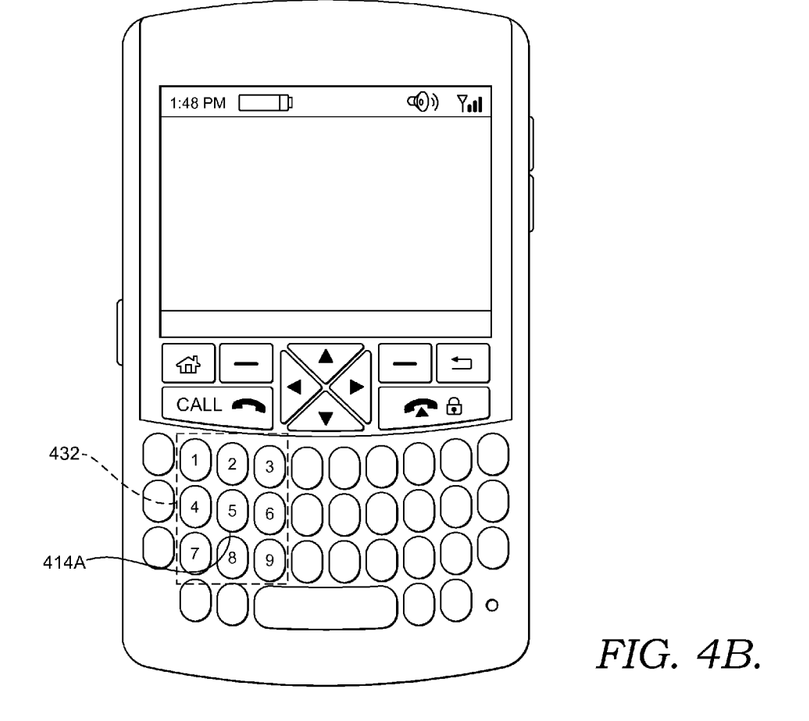

If key 414 were pressed initially, then this would cause a portion of the keys of the keyboard to be configured in a specific configuration, which is illustratively shown in FIG. 4B.

FIG. 4B indicates that a set of keys 432 will, when pressed, convey the numerals "1"-"9" with the "5" key being in the center, which is indicated by reference numeral 414A (note that this is in the same position of key 414 of FIG. 4). The markings of the keys in set 432 are for informational purposes. Unless the markings themselves were dynamically configurable, the actual markings of FIG. 3A would remain the same. But this would not be relevant to a person who was handling the device without looking at the keys. For example, perhaps a person is handling the device while not looking at it or while the device cannot be seen. Examples of this include people with visual impairments or any number of situations when a person is operating the device without looking at the keypad.

All the person needs to know is which key was initially pressed. That key becomes the "5" key. The keys immediately around it become the numerals "1"-"9" except for "5," which is already the center key. In this way, a person no longer needs to find a single key as being the "5" key. Rather, any key of an appropriate row can become the "5" key when depressed. We have already shown two examples. Other examples are also shown.

Figure 4C:
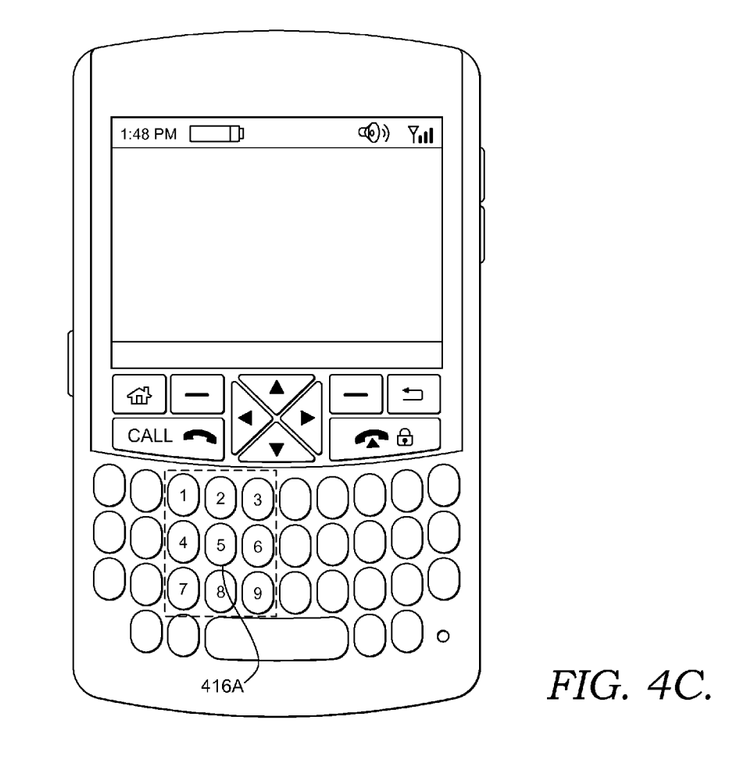
Figure 4D:
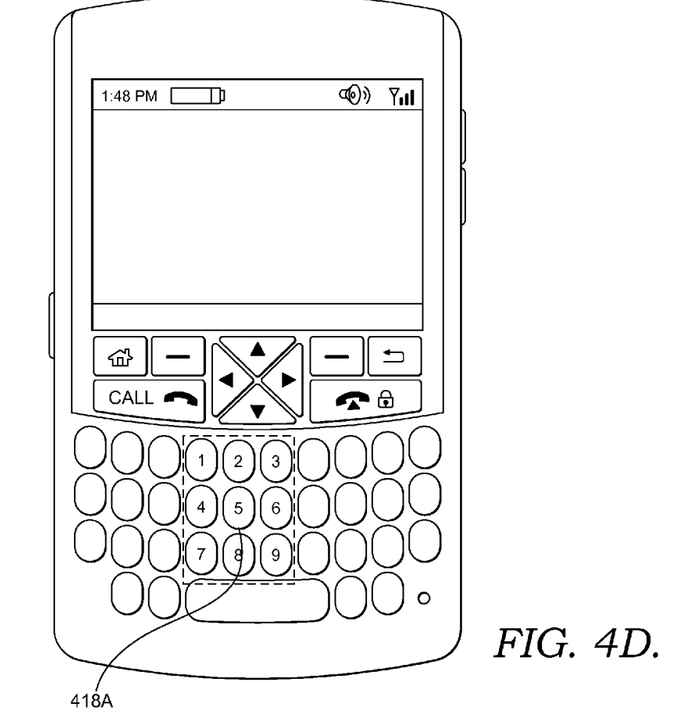
Figure 4E:
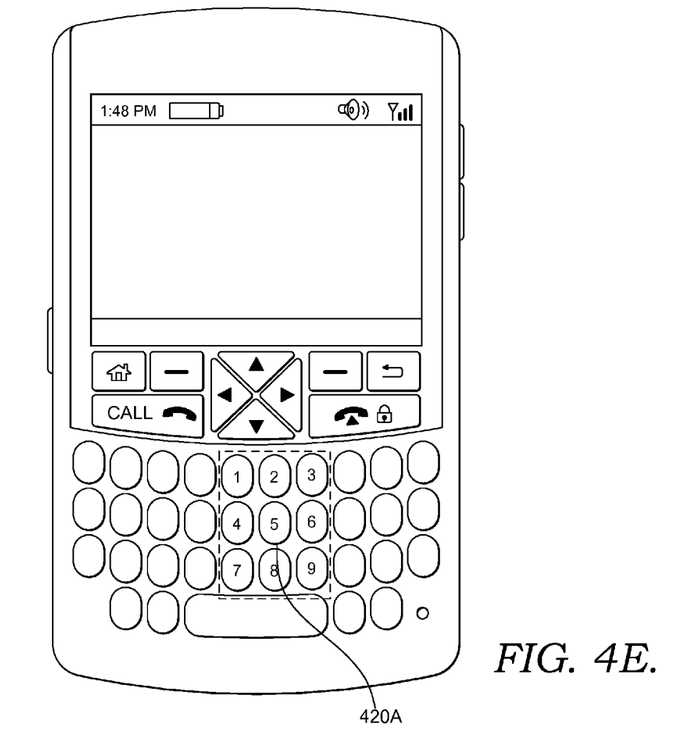
Figure 4F:
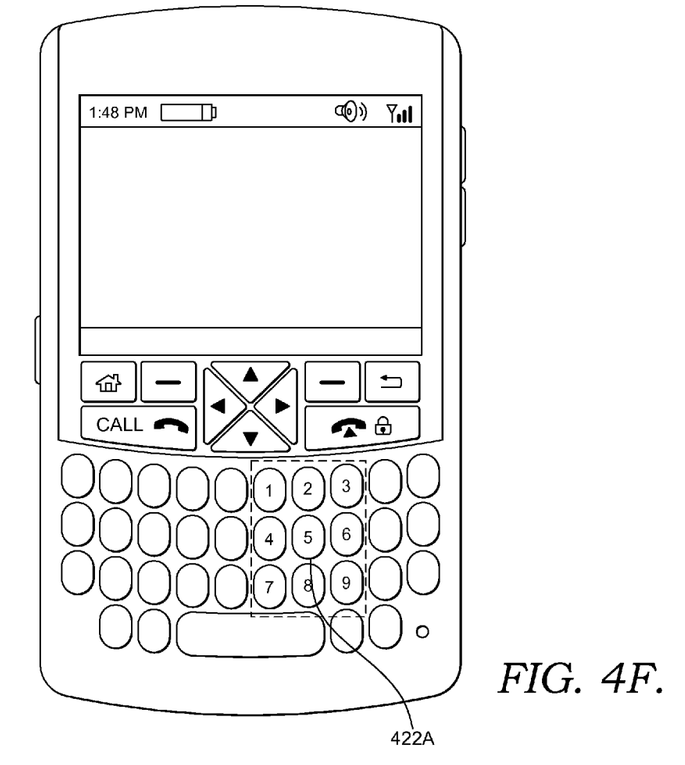
Figure 4G:
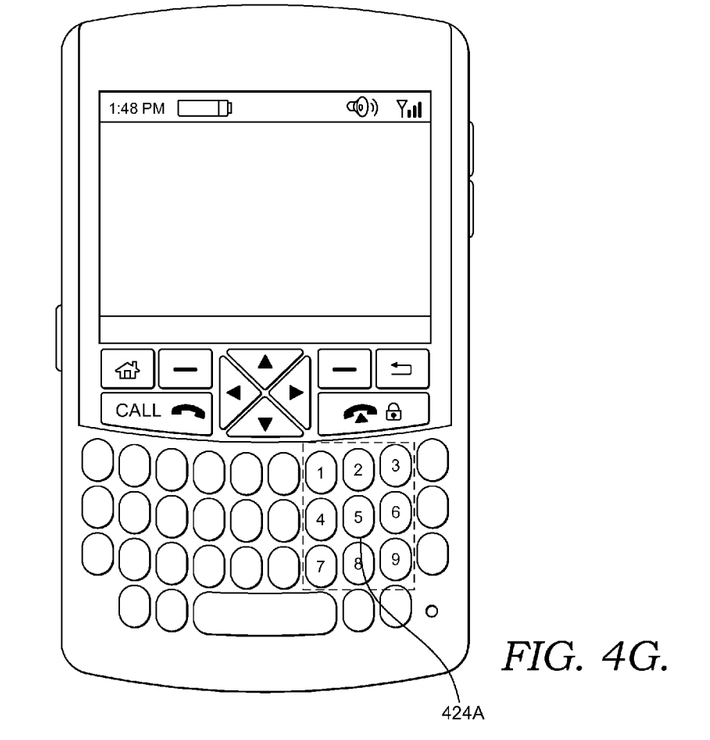
Figure 4H:
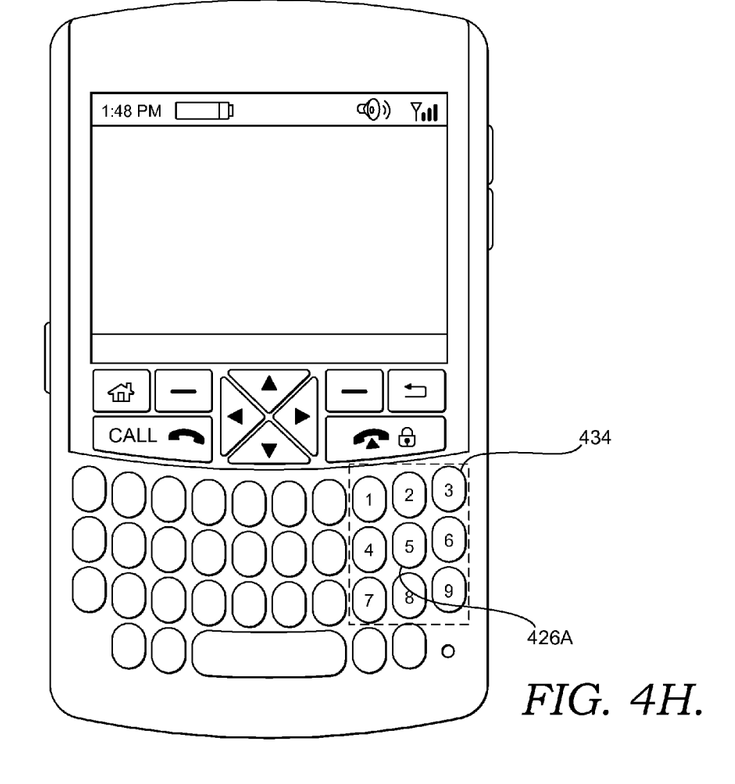

For example, FIG. 4C indicates a mapping in which key 416 is initially depressed. In that embodiment, the keys are dynamically configured to reflect the value shown in FIG. 4C, in which key 416A becomes the "5" key. When key 418 is depressed, the configuration of FIG. 4C is implemented. When key 420 is depressed, a configuration as shown in FIG. 4E is created in which key 420A is the "5" key. When key 422 is pressed, a configuration as shown in FIG. 4F is effected by application 113, in which key 422A is the "5" key. In all of the configurations, the remaining digits "1"-"9" are mapped to the keys surrounding the configured "5" key. Thus, when key 424 is initially pressed, then a configuration as shown in FIG. 4G is created in which key 424A is the "5" key. Finally, if key 426 is pressed, then a configuration as shown in FIG. 4H is created in which key 426A is the "5" key.

With the "5" key in the center, the Arabic numeral "1" of each configuration is to the northwest of the "5" key; the Arabic numeral "2" to the north; the Arabic numeral "3" to the northeast; the Arabic numeral "4" to the due west; the Arabic numeral "6" to the due east; the Arabic numeral "7" to the southwest; the Arabic numeral "8" to the due south; and the Arabic numeral "9" to the southeast of the center key.

In this way, when additional input is received, it is received consistent with the dynamically configured and mapped keys. For example, with reference to FIG. 4H for example, when key 434 is depressed, input is received by the mobile device as being the Arabic numeral "3." The input itself is in a computer-readable format; examples of which include binary and ASCII.

As previously mentioned, in one embodiment the mobile device can be set to a first mode in which the keys 310 are not dynamically reconfigured. But in another mode, the keys 310 can be dynamically reconfigured incident to receiving input from a key in an appropriate row, such as row 410 of FIG. 4. Thus, in this second mode, whatever key is initially pressed becomes the "5" key. The modes can be varied by way of a certain string input, a designated key, or a switch for example.

When we speak of something being initially depressed, that too can relate to a mode configuration or reset procedure. For example, perhaps key 320 of FIG. 3A is the "Clear" key. Every time the "Clear" key 320 is depressed, then mobile device 300 is configured to receive the next key entered as being the "5" key. Then, additional input is received consistent with the dynamic configuration of the initial key pressed. But if the user selects key 320 while entering data, then, in one embodiment, the next key pressed will become the new "5" key.

Figure 5:
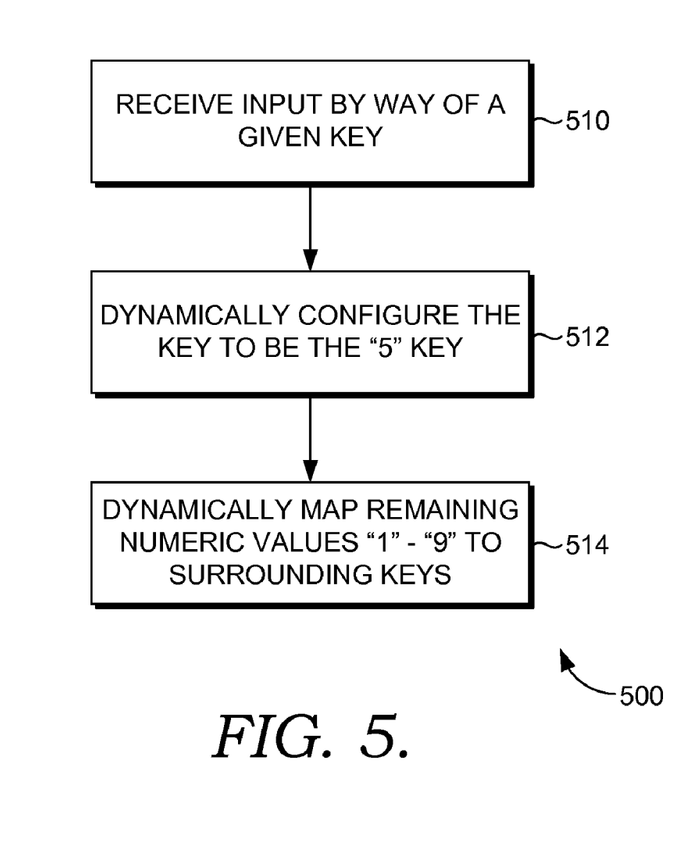
FIG. 5 depicts an illustrative method for receiving data from a keypad of a mobile communications device in accordance with an embodiment of the present invention.

Turning now to FIG. 5, an illustrative method of receiving data from a keypad of a mobile communications device is provided and referenced generally by the numeral 500. According to this embodiment, input is received by way of a given key at a step 510. By way of example, assume that the given key is key 412 of FIG. 4. At a step 512, that key is dynamically configured to be the "5" key. Thus, as shown in FIG. 4A, key 412A (which is key 412 in this example) becomes the "5" key.

At a step 514, the keys surrounding the newly configured "5" key are mapped to the remaining numerical values "1"-"9."

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. A mobile communications device, comprising:
a set of physically depressible keys that includes keys for all 26 letters of the English alphabet,
 (1) wherein said set of keys is made up of three rows of keys that include a first row, a second row, and a third row, and
 (2) wherein said second row includes a plurality of keys situated between a left-most key and a right-most key; and
computer-readable media that includes a set of computer-executable instructions embodied thereon that, when executed, cause at least a portion of the set of keys to be configured in a specified configuration incident to receiving input from any key (hereafter "a certain key") of the second row other than said left-most key or said right-most key, the specified configuration including,
 (1) the certain key is mapped to the Arabic numeral "5," such that when said certain key is pressed, a "5" is received as input into the mobile communications device, and
 (2) a set of contiguous keys that immediately surround said certain key are respectively mapped to Arabic numerals "1" through "9," except for the Arabic numeral "5," which was already mapped to said certain key.

2. The mobile communications device of claim 1, wherein said second row of keys includes keys to convey the following characters as input: A, S, D, F, G, H, J, K, and L.

3. The mobile communications device of claim 2, wherein said mobile communications device includes a radio that enables it to communicate with a wireless telecommunications network.

4. The mobile communications device of claim 2, wherein eight keys are, incident to receiving input via any one key, dynamically mapped to Arabic numerals "1" through "9," except for "5," which is already mapped to the any one key.

5. The mobile communications device of claim 1, wherein said set of contiguous keys being mapped results in the following with respect to the certain key, being in the center:
the Arabic numeral "1"=northwest;
the Arabic numeral "2"=north;
the Arabic numeral "3"=northeast;
the Arabic numeral "4"=west;
the Arabic numeral "6"=east;
the Arabic numeral "7"=southwest;
the Arabic numeral "8"=south; and
the Arabic numeral "9"=southeast.

6. The mobile communications device of claim 1, wherein every key in said set of physically depressible keys has a flat upper surface such that no key includes a protrusion that protrudes upward and away from said otherwise flat upper surface.

7. The mobile communications device of claim 6, wherein said mobile communications device is a clamshell type of device such that a display of said mobile communications device is hinged so that it closes on said set of physically depressible keys.

8. The mobile communications device of claim 1 wherein any one key is surrounded by eight keys.

9. Computer-readable media having computer-executable instructions embodied thereon that, when executed, facilitate a method of receiving data from a keypad of a mobile communications device, the method comprising:
receiving input by way of a given key of the keypad;
dynamically configuring said given key to be a "5" key such that said input received is received as the Arabic numeral "5" regardless of a prior configuration associated with said given key; and dynamically mapping numeric values to a set of eight keys that surround said given key, wherein said numeric values are Arabic numerals "1" through "9" except for "5."

10. The media of claim 9, wherein said input received is received as information encoded in a computer-readable format.

11. The media of claim 10, wherein said computer-readable format includes a binary format or an ASCII format.

12. The media of claim 9, wherein said dynamically mapping numeric values result in the following mappings of values to corresponding keys with respect to the given key:

the Arabic numeral "1"=northwest;
the Arabic numeral "2"=north;
the Arabic numeral "3"=northeast;
the Arabic numeral "4"=west;
the Arabic numeral "6"=east;
the Arabic numeral "7"=southwest;
the Arabic numeral "8"=south; and
the Arabic numeral "9"=southeast.

13. The media of claim 12, further comprising,
receiving additional input via said set of eight keys; and
communicating said additional input to said mobile communications device consistent with said mappings of values.

14. A mobile communications device comprising a plurality of physically depressible keys, each of which when pressed conveys a certain character input when said mobile device is in a first mode, but when said device is in a second mode then any one key of said plurality of keys conveys the Arabic numeral "5" as character input to the mobile communications device.

* * * * *